Patented Mar. 15, 1927.

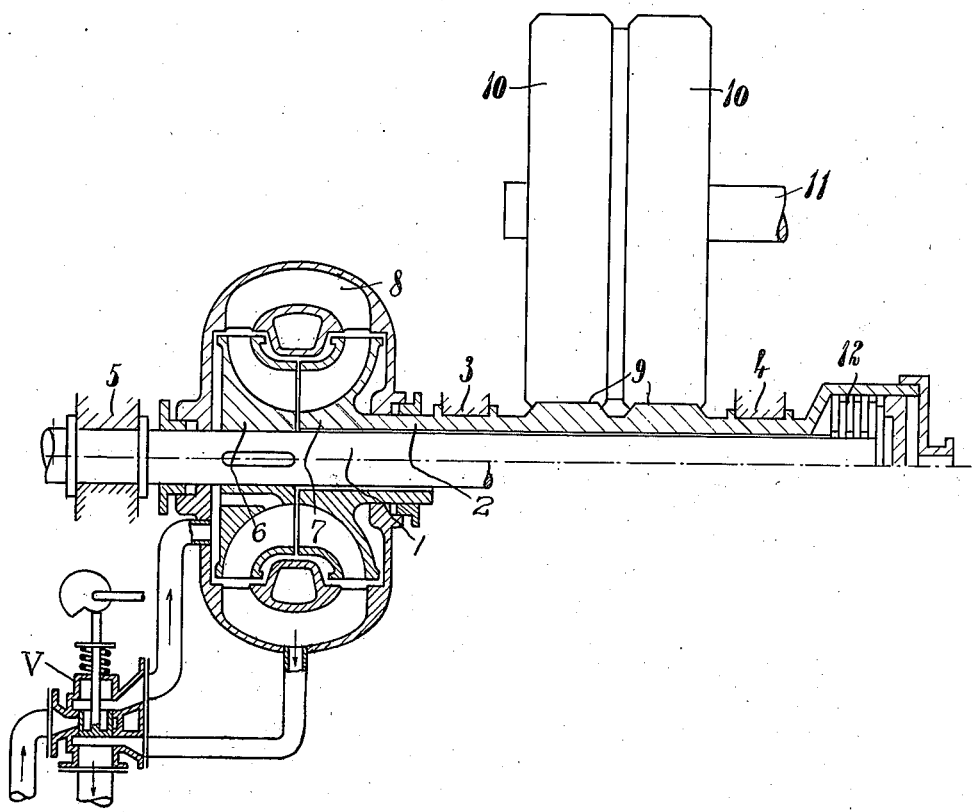

1,621,228

UNITED STATES PATENT OFFICE.

OSCAR ANTON WIBERG, OF FINSPONG, SWEDEN.

REVERSIBLE POWER-TRANSMISSION DEVICE.

Application filed January 5, 1923, Serial No. 610,896, and in Sweden January 2, 1922.

This invention relates to reversible power transmission devices.

The object of the invention is to provide a reversible power transmission device, especially for large amounts of power, which may operate completely soundless both in running ahead and in running back and which does not show any losses of power in ahead running.

To obtain these and other advantages the power transmission device according to this invention comprises in combination a hydraulic gear for reverse transmission adapted to operate in backwards running and one or more laminated friction coupling adapted to operate in forward running.

The accompanying drawing shows a longitudinal section of an embodiment of the invention.

The invention is used for the transmission of power between two shafts of which one surrounds the other concentrically. 1 is the driving inner shaft and 2 is the tubular driven shaft surrounding said shaft 1. The shaft 2 is mounted in bearings 3 and 4 and the shaft 1 is carried, in part, by the shaft 2 and, in part, by bearings outside thereof. Such a bearing is shown at 5. The shaft 1 carries a pump wheel 6, while the shaft 2 carries a turbine wheel 7 having a stationary distributor 8 connecting the delivery side of the pump wheel to the inlet side of the turbine wheel so as to form a hydraulic gear of a character well known per se to transmit a reverse movement from the pump wheel to the turbine wheel. The shaft 2 further carries a double pinion 9 meshing in a toothed wheel 10 attached to the operating shaft 11. The free ends of the shafts 1 and 2 are connected together by a laminated friction clutch 12 the bars of which are controlled in any convenient manner.

To transmit a non-reversed motion from shaft 1 and to shaft 2 the laminated friction clutch 12 is thrown into gear, the hydraulic gear being at the same time kept emptied of liquid by means of the valve mechanism V shown in Fig. 1. The shafts 1 and 2 are thus directly coupled together and will rotate in conjunction, the hydraulic gear at the same time running without load.

To obtain backwards running the clutch 12 is released and water is passed to the hydraulic gear which will then first operate as a liquid brake, until it has been completely filled. The pump 6 will then operate in well known manner to pass the water through the distributor guide blades 8 in which the direction of movement of the water is reversed, and to the turbine 7 which is caused, together with shaft 2, to rotate in the opposite direction to the direction of movement of the pump wheel and the shaft 1.

The advantage inherent to the combination described above is to be seen in the fact that in forward running all losses are obviated, as the shafts 1 and 2 are connected together directly and the hydraulic gear is running light. As there is no ratio of transmission in the hydraulic gear, no air friction losses will occur. Furthermore, the hydraulic gear acts as a brake, that is, takes up the work of the masses in the moment of reversal, in changing from forward running to backwards running. In changing from backwards to forward running the friction clutch 12 must take up this work; however, it is only rarely the case that the said last mentioned reversing operation must be effected speedily at great amounts of power, that is, in changing from full speed back to full speed ahead.

A power transmission device based on this principle will, moreover, operate completely soundless in running ahead as well as in running back.

What I claim is:—

1. In a power transmission device the combination with a driving shaft, of a driving hydraulic transmission element on said driving shaft at an intermediate point thereof, laminated friction clutch elements at one end of said shaft, a hollow shaft surrounding concentrically said driving shaft from said end thereof to said transmission element, laminated friction clutch elements at one end of said hollow shaft engaging alternately between said first mentioned laminated friction clutch elements, a driven hydraulic transmission element on the opposite end of said hollow shaft, adapted for operation in the opposite direction to said driving element, a distributor between said hydraulic transmission elements, and mechanical gear elements on said hollow shaft intermediate between its ends.

2. In a reversible power transmission device the combination with a driving shaft, of a driving hydraulic transmission element on said driving shaft at an intermediate point thereof, laminated friction clutch elements at one end of said shaft, a hollow shaft surrounding concentrically said driving shaft from said end thereof to said transmission element, laminated friction clutch elements at one end of said hollow shaft engaging alternately between said first mentioned laminated friction clutch elements, a driven hydraulic transmission element on the opposite end of said hollow shaft, adapted for operation in the opposite direction to said driving element, a stationary distributor between said hydraulic transmission elements to form therewith a hydraulic transmission gear for reverse power transmission, means for emptying and filling said hydraulic gear, and mechanical gear elements on said hollow shaft intermediate between its ends.

In testimony whereof I have signed my name.

OSCAR ANTON WIBERG.